(12) United States Patent
Inagaki et al.

(10) Patent No.: US 9,762,327 B2
(45) Date of Patent: Sep. 12, 2017

(54) SINGLE-CORE OPTICAL TRANSCEIVER

(71) Applicants: HAMAMATSU PHOTONICS K.K., Hamamatsu-shi, Shizuoka (JP); Nanjing Guanglu Electronics Co., Ltd., Pukou District, Nanjing (CN); CHINA ELECTRIC POWER RESEARCH INSTITUTE, Beijing (CN)

(72) Inventors: Yuto Inagaki, Hamamatsu (JP); Takayuki Suzuki, Hamamatsu (JP); Guo Xiang Hu, Nanjing (CN); Weimin Hao, Beijing (CN)

(73) Assignees: HAMAMATSU PHOTONICS K.K., Hamamatsu-shi, Shizuoka (JP); Nanjing Guanglu Electronics Co., Ltd., Nanjing (CN); CHINA ELECTRIC POWER RESEARCH INSTITUTE, Beijing (CN)

( * ) Notice: Subject to any disclaimer, the term of this patent is extended or adjusted under 35 U.S.C. 154(b) by 0 days.

(21) Appl. No.: 14/647,222

(22) PCT Filed: Nov. 26, 2013

(86) PCT No.: PCT/CN2013/087869
§ 371 (c)(1),
(2) Date: May 26, 2015

(87) PCT Pub. No.: WO2014/082567
PCT Pub. Date: Jun. 5, 2014

(65) Prior Publication Data
US 2015/0311981 A1 Oct. 29, 2015

(30) Foreign Application Priority Data
Nov. 28, 2012 (CN) .......................... 2012 1 0492427

(51) Int. Cl.
*H04B 10/00* (2013.01)
*H04B 10/40* (2013.01)
(Continued)

(52) U.S. Cl.
CPC .......... *H04B 10/40* (2013.01); *G02B 6/4246* (2013.01); *H04B 10/25* (2013.01); *H04B 10/43* (2013.01); *H04B 10/572* (2013.01)

(58) Field of Classification Search
CPC ........ H04B 10/40; H04B 10/43; H04B 10/25; H04B 10/572; H04B 10/00; G02B 6/4246
See application file for complete search history.

(56) References Cited

U.S. PATENT DOCUMENTS

2004/0051111 A1* 3/2004 Ota .................. B82Y 20/00
257/98
2004/0136658 A1* 7/2004 Kropp ................ G02B 6/4246
385/88
(Continued)

FOREIGN PATENT DOCUMENTS

CN    1338783 A    3/2002
CN    1507065 A    6/2004
(Continued)

OTHER PUBLICATIONS

English-language translation of International Preliminary Report on Patentability (IPRP) dated Jun. 11, 2015 that issued in WO Patent Application No. PCT/CN2013/087869.

*Primary Examiner* — Danny Leung
(74) *Attorney, Agent, or Firm* — Drinker Biddle & Reath LLP

(57) ABSTRACT

A single-core optical transceiver is an optical transceiver for transmitting or receiving an optical signal through a single optical fiber. The single-core optical transceiver has a light emitting device for transmitting the optical signal and a light receiving device for receiving the optical signal. The light (Continued)

emitting device is an LED configured including a sapphire substrate arranged on a light receiving surface of the light receiving device so as to be coaxial with the light receiving surface, and a nitride semiconductor layer laid on the sapphire substrate. Even with the light emitting device being arranged on the light receiving surface of the light receiving device, the optical signal from the optical fiber can be received on the entire area of the light receiving surface, so as to adequately improve the light sensitivity.

9 Claims, 9 Drawing Sheets

(51) Int. Cl.
  *G02B 6/42* (2006.01)
  *H04B 10/25* (2013.01)
  *H04B 10/572* (2013.01)
  *H04B 10/43* (2013.01)

(56) References Cited

U.S. PATENT DOCUMENTS

| | | | | |
|---|---|---|---|---|
| 2005/0053379 | A1* | 3/2005 | Jockerst | G02B 6/4246 398/139 |
| 2006/0127017 | A1* | 6/2006 | Saito | G02B 6/4292 385/120 |
| 2006/0170332 | A1* | 8/2006 | Tamaki | C09K 11/02 313/498 |
| 2007/0025405 | A1* | 2/2007 | Pan | H01S 5/0262 372/50.21 |
| 2007/0147032 | A1 | 6/2007 | Furukawa et al. | |
| 2007/0154222 | A1* | 7/2007 | Kim | H04B 10/43 398/141 |
| 2007/0292141 | A1* | 12/2007 | Kim | H04B 10/1149 398/182 |
| 2009/0162073 | A1* | 6/2009 | Ojima | G02B 6/2835 398/139 |
| 2010/0302191 | A1* | 12/2010 | Ye | G06F 3/0428 345/173 |
| 2014/0341567 | A1* | 11/2014 | Schweninger | H04B 10/073 398/30 |
| 2015/0311981 | A1* | 10/2015 | Inagaki | H04B 10/40 398/135 |

FOREIGN PATENT DOCUMENTS

| | | |
|---|---|---|
| CN | 101055911 | 10/2007 |
| GB | 2350441 | 11/2000 |
| JP | S61-017760 | 2/1986 |
| JP | H10-200154 A | 7/1998 |
| JP | H11-020874 | 1/1999 |
| JP | 2000-304984 | 11/2000 |
| JP | 2002-064221 | 2/2002 |
| JP | 2003-083887 | 3/2003 |
| JP | 2003-307656 A | 10/2003 |
| JP | 2004-055567 | 2/2004 |
| JP | 2008-277865 | 11/2008 |
| JP | 2010-237029 | 10/2010 |
| JP | 2012-091123 | 5/2012 |
| JP | 2012-199502 | 10/2012 |
| JP | 2012-231122 | 11/2012 |

\* cited by examiner

Fig.9

| | LED size | Exposure ratio of PD reception surface | Reception loss |
|---|---|---|---|
| EXAMPLE | 0.12mm$^2$ | 0.76 | -1.5dBm |
| COMPARATIVE EXAMPLE | 0.053mm$^2$ | 0.89 | -2.5dBm |

SINGLE-CORE OPTICAL TRANSCEIVER

TECHNICAL FIELD

The present invention relates to an optical transmission device and, more particularly, to a single-core optical transceiver.

BACKGROUND ART

In the case of the conventional optical transceivers for optical fiber communications, an optical fiber was used to connect a transmitter of a host device to a receiver of a communication partner device and another optical fiber was used to connect a receiver of the host device to a transmitter of the communication partner device, requiring a plurality of optical fibers. From the viewpoint of simplifying the device configuration, for example, the module for optical transmission/reception described in Japanese Patent Application Laid-open Publication No. 2003-307656 adopts a configuration using a branching filter to couple the optical axis of a light emitting device and the optical axis of a light receiving device to a single fiber. A configuration on the optical transceiver side is, for example, the optical semiconductor device described in Japanese Patent Application Laid-open Publication No. H10-200154, in which a light emitting portion and a light receiving portion are formed each on the same substrate, the light emitting portion is arranged in a central region of the substrate, and the light receiving portion is arranged in such a ring shape as to surround the light emitting portion.

SUMMARY OF INVENTION

Technical Problems

It is considered, however, that, since the configuration as in the foregoing Patent Literature 2 is so arranged that the light emitting portion is located in the center of the substrate and that the light receiving portion is arranged around it, the light receiving portion cannot receive light in the central region where the light intensity is the highest in light from the optical fiber and it results in failing to achieve sufficient light sensitivity. Another problem is that there are restrictions on materials because the light emitting portion and the light receiving portion are formed on the same substrate.

The present invention has been accomplished to solve the problems as described above, and it is an object of the present invention to provide an optical transceiver with satisfactory light sensitivity ensured for optical communication by use of a single optical fiber.

Solution to Problems

For solving the above problems, a single-core optical transceiver according to the present invention is an optical transceiver for transmitting or receiving an optical signal through a single optical fiber, comprising a light emitting device for transmitting the optical signal and a light receiving device for receiving the optical signal, wherein the light emitting device is an LED configured including a sapphire substrate arranged on a light receiving surface of the light receiving device so as to be coaxial with the light receiving surface, and a nitride semiconductor layer laid on the sapphire substrate.

In this single-core optical transceiver, the sapphire substrate is arranged on the light receiving surface of the light receiving device so as to be coaxial with the light receiving surface and the nitride semiconductor layer is formed on the sapphire substrate, thereby constituting the LED to serve as the light emitting device. In this configuration, the light receiving device and the light emitting device are coaxially arranged, thereby enabling coupling to the single optical fiber. Since the sapphire substrate is used as the substrate of the light emitting device, the optical signal in a wavelength band with low transmission loss in the optical fiber can be guided through the sapphire substrate up to the light receiving surface of the light receiving device. Therefore, even in the configuration where the light emitting device is arranged on the light receiving surface of the light receiving device, the optical signal from the optical fiber can be received on the entire area of the light receiving surface, so as to adequately improve the light sensitivity.

In the foregoing single-core optical transceiver, the light emitting device is fixed to the light receiving surface of the light receiving device through a resin transparent to an emission wavelength of the light emitting device. The resin is an epoxy resin or a silicone resin. In this case, the light sensitivity can be more adequately improved.

In the foregoing single-core optical transceiver, a cathode electrode pad and an anode electrode pad in the light emitting device are provided both on the light emitting surface side of the light emitting device. In this case, there is no need for forming electrodes, wires, etc. on a back surface of the light emitting device (the surface opposite to the light emitting surface), and thus a sufficient transmission region for the optical signal can be secured in the sapphire substrate. Therefore, the light sensitivity can be more adequately improved.

In the foregoing single-core optical transceiver, a wavelength of the optical signal transmitted from the light emitting device is from 450 nm to 600 nm. The wavelength of the optical signal transmitted from the light emitting device is preferably 510 nm. A sufficient transmittance of the sapphire substrate can be ensured by use of the optical signal in this wavelength band. Therefore, the light sensitivity can be more adequately improved.

The single-core optical transceiver preferably further comprises a switch for suspending an operation of the light receiving device during an operation of the light emitting device and for suspending the operation of the light emitting device during the operation of the light receiving device. This configuration can suppress noise in the light receiving device due to the emission of the light emitting device and a failure due to diffuse reflection during reception of light by the light receiving device. The optical transceiver may be configured as follows: an anode and a cathode of the light receiving device are connected through a discharge switch; the discharge switch is turned on during the operation of the light emitting device; and the discharge switch is turned off during the operation of the light receiving device. Or, the optical transceiver may be configured as follows: a cathode end of the light receiving device is connected through a discharge switch to a reference potential; the discharge switch is turned on during the operation of the light emitting device; and the discharge switch is turned off during the operation of the light receiving device. This configuration allows the optical transceiver to discharge an electric charge generated in the light receiving device due to light generated by the light emitting device in a transmission mode, so as to suppress malfunction and thus allows the optical transceiver to be switched to a normal operation immediately after a changeover to a reception mode.

In the foregoing single-core optical transceiver, the single optical fiber is a plastic optical fiber. The plastic optical fiber is matched well with green light, so as to adequately ensure the light sensitivity in optical communication.

Advantageous Effects of Invention

According to the present invention, the light emitting device and the light receiving device are coaxially arranged in the single-core optical transceiver, whereby the optical transmission and reception functions can be realized with the single optical fiber. The single-core bidirectional optical communication function can be realized with use of the operation modes in the half-duplex communication method. Since the sapphire substrate is selected as the substrate of the light emitting device, the green light is selected as the transmitted light signal, and the plastic optical fiber is selected as the light transmission medium, the light sensitivity can be adequately improved while keeping the transmission loss of the optical fiber low.

BRIEF DESCRIPTION OF DRAWINGS

FIG. 9 is a drawing showing a list of the results of an experiment to confirm the effects of the present invention.

LIST OF REFERENCE SIGNS

1 single-core optical transceiver; 2 optical fiber; 3 lens; 11 lead frame; 12 light receiving device; 12*a* light receiving surface; 13 light emitting device; 13*a* nitride semiconductor layer; 13*b* sapphire substrate; 13*c* light emitting surface; 14 resin layer; 21 cathode electrode pad; 22 anode electrode pad; 23 wire; 24 wire; 25 cathode electrode pad; 26 wire; 31 switch; 32 controller.

DESCRIPTION OF EMBODIMENTS

Preferred embodiments of the optical transceiver according to the present invention will be described below in detail with reference to the drawings.

Figure 1:
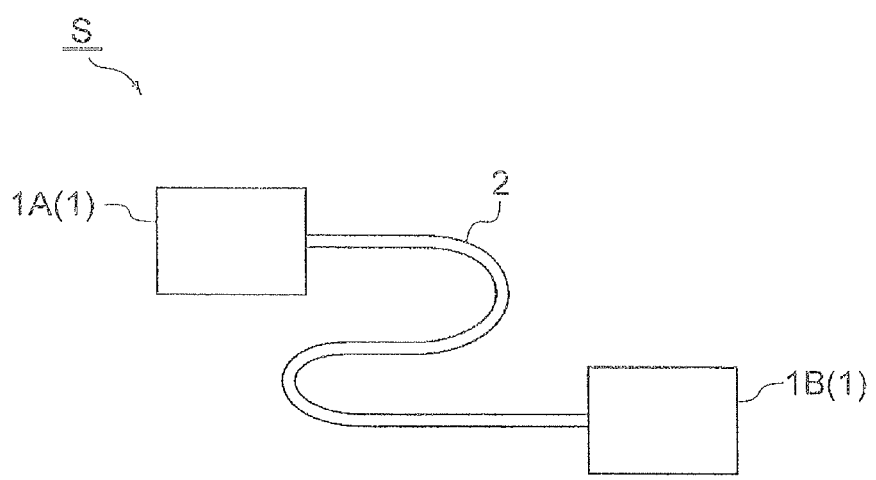
FIG. 1 is a drawing showing a schematic configuration of an optical communication system configured with use of single-core optical transceivers according to one embodiment of the present invention.

FIG. 1 is a drawing showing a schematic configuration of an optical communication system configured by use of optical transceivers according to one embodiment of the present invention. As shown in the same figure, the optical communication system S is configured with a pair of single-core optical transceivers 1 (1A, 1B) connected by a single optical fiber 2 and is, for example, a single-core bidirectional system used in a local network. In the optical communication system 5, transmission/reception of optical signal is executed in the half-duplex communication method in which transmission and reception operations are not carried out concurrently, by functions of the optical transceivers 1A, 1B.

Figure 2:
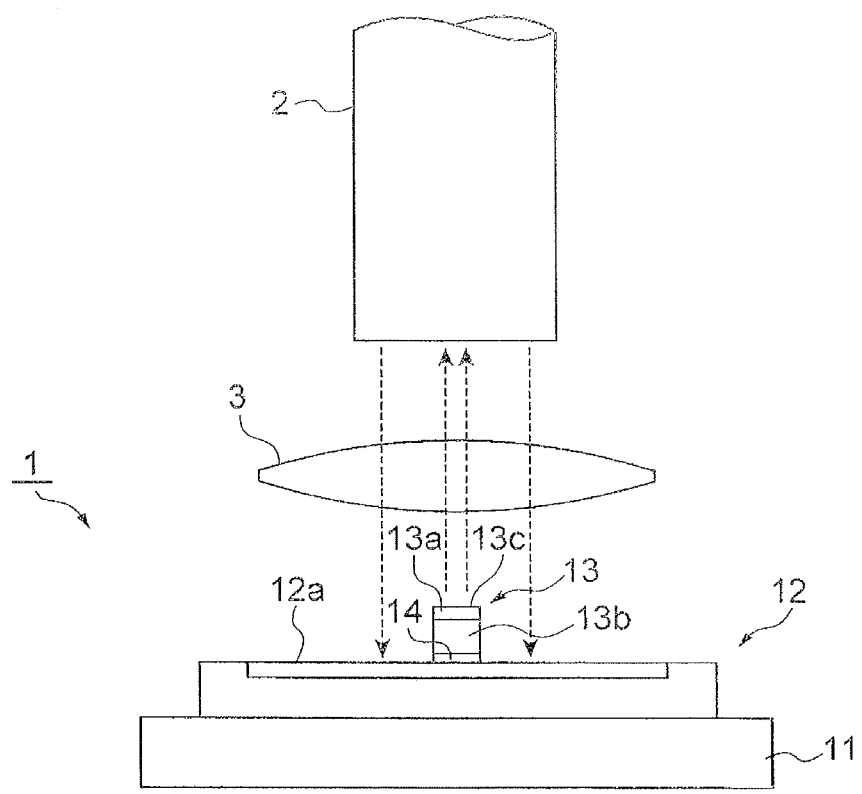
FIG. 2 is a cross-sectional view of a configuration of the single-core optical transceiver according to the present invention.

The optical transceiver 1 to perform transmission/reception of optical signal is coupled through a lens 3 to the optical fiber 2, as shown in FIG. 2. The optical fiber 2 to be used herein is, for example, a large-diameter plastic optical fiber with the core diameter of about 1 mm. The plastic optical fiber has such typical characteristics that the transmission loss is not more than 100 dB/km for light at wavelengths of about 450 nm to 600 nm and the transmission loss is the smallest for light at about 500 nm to 550 nm and, particularly, for light around 510 nm.

The single-core optical transceiver 1 is configured with a light receiving device 12 formed on a lead frame 11 and a light emitting device 13 formed on the light receiving device 12. The light receiving device 12 is, for example, an Si photodiode and is formed in a rectangular shape on a plan view thereof in a configuration wherein the lead frame 11 serves as an anode electrode and wherein a p-type semiconductor layer, an n-type semiconductor layer, an insulating layer, and a cathode electrode pad 25 (cf. FIG. 3) penetrating the insulating layer to the n-type semiconductor layer are successively laid on the lead frame 11. A light receiving surface 12*a* of a substantially circular shape is provided on the face opposite to the lead frame 11 in the light receiving device 12, to receive an optical signal at the wavelengths of about 450 nm to 600 nm emitted from the optical fiber 2.

On the other hand, the light emitting device 13 is, for example, an LED in which a nitride semiconductor layer 13*a* is laid on a sapphire substrate 13*b*. The sapphire substrate 13*b* is a substrate transparent to a wide range of wavelengths from near-ultraviolet light to infrared light, and is arranged on the light receiving surface 12*a* of the light receiving device 12. The light emitting device 13 is formed in a rectangular shape on a plan view thereof in a configuration wherein a buffer layer, an n-type GaN cladding layer, an InGaN/GaN active layer, and a p-type GaN cladding layer are successively laid as the nitride semiconductor layer 13*a* on this sapphire substrate 13*b*. A light emitting surface 13*c* of a substantially rectangular shape is provided on the face opposite to the sapphire substrate 13*b* in the light emitting device 13 and emits an optical signal at the wavelengths of about 450 nm to 600 nm toward the optical fiber 2.

The light emitting device 13 is formed in the size sufficiently smaller than the light receiving surface 12*a* of the light receiving device 12 and is arranged on a substantially central region of the light receiving surface 12*a* so as to be coaxial with the light receiving surface 12*a*. This light emitting device 13 is fixed to the light receiving device 12 through a resin layer 14 transparent to the emission wavelengths of the light emitting device 13, e.g., through an adhesive such as epoxy resin or silicone resin, while the sapphire substrate 13*b* side is opposed to the light receiving surface 12*a*. The center axes of the light receiving surface 12*a* and the light emitting surface 13*e* are adjusted so as to be aligned with the optical axis of the optical fiber 2. Therefore, as shown in FIG. 2, the optical signal emitted from the light emitting device 13 is coupled through the lens 3 to the optical fiber 2 and the optical signal emitted from the optical fiber 2 is coupled through the lens 3 to the light receiving device 12.

In this regard, the light emitting device 13 is arranged on the light receiving surface 12a of the light receiving device 12 and in the light emitting device 13 the thickness of the sapphire substrate 13b is dominant over the thickness of the nitride semiconductor layer 13a. Therefore, most of light in the central region in the optical signal emitted from the optical fiber 2 passes through the light emitting device 13 to reach the light receiving device 12.

Figure 3:
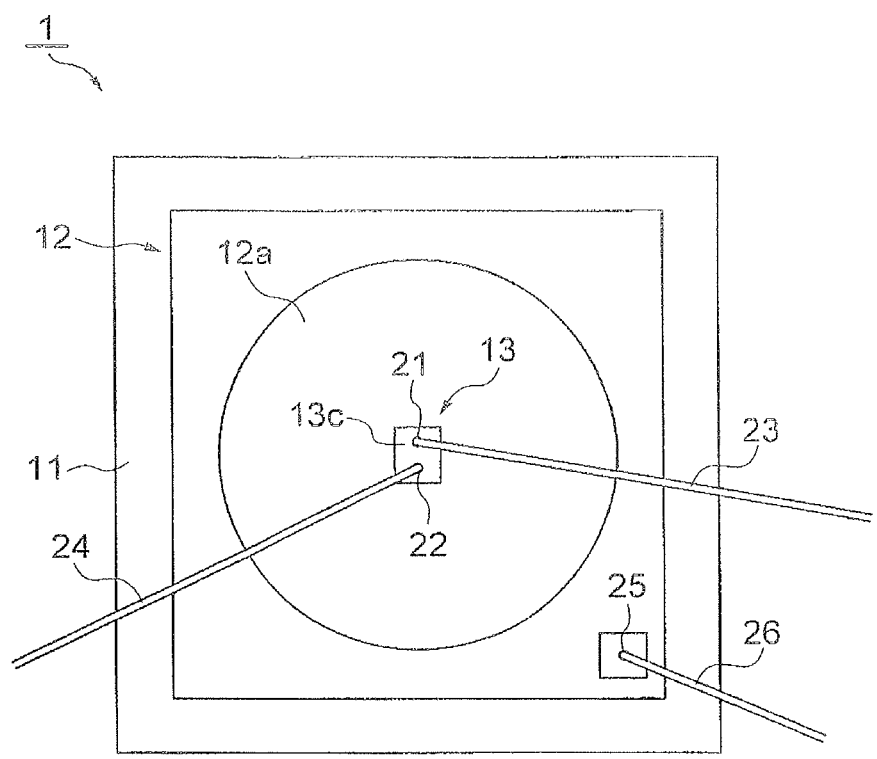
FIG. 3 is a plan view of the single-core optical transceiver according to the present invention.

Furthermore, the p-type GaN cladding layer and the n-type GaN cladding layer of the light emitting device 13 are exposed both in part on the light emitting surface 13c side. As shown in FIG. 3, a cathode electrode pad 21 connected to the n-type GaN cladding layer and an anode electrode pad 22 connected to the p-type Clare cladding layer are arranged both on the light emitting surface 13c side of the light emitting device 13. The cathode electrode pad 21 and the anode electrode pad 22 are electrically connected through respective wires 23, 24 to a predetermined circuit. A cathode electrode pad 25 of the light receiving device 12 is arranged at a position where it does not overlap the light receiving surface 12a, on the light receiving surface 12a side of the light receiving device 12. This cathode electrode pad 25 is also electrically connected through a wire 26 to the predetermined circuit.

The wire 23 connected to the cathode electrode pad 21 and the wire 24 connected to the anode electrode pad 22 are located in front of the light receiving surface 12a to interrupt part of the optical signal emitted from the optical fiber 2, but the diameters of the wires 23, 24 are suitably selected to make the area interrupted by the wires 23, 24 sufficiently small relative to the light receiving surface 12a, so as to adequately suppress the effects on the light sensitivity of the single-core optical transceiver 1.

Figure 4:
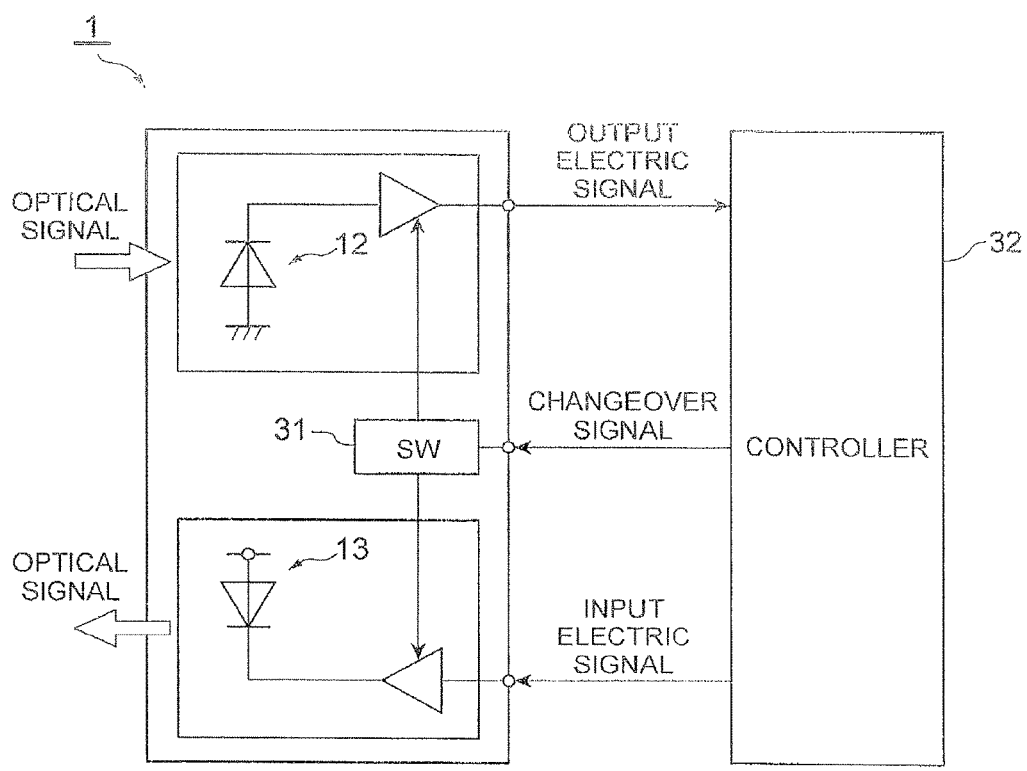
FIG. 4 is a block diagram showing constitutive elements to realize the half-duplex communication function of the single-core optical fiber according to the present invention.

Furthermore, the single-core optical transceiver 1, as shown in FIG. 4, has a switch 31 for controlling operations of the light emitting device 13 and the light receiving device 12 described above. This switch 31 is controlled by a changeover signal from a controller 32 provided outside the single-core optical transceiver 1 and operates to keep the output of the light receiving device 12 at a low level during emission of light from the light emitting device 13 so as to substantially suspend the operation of the light receiving device 12 and to keep the output of the light emitting device 13 at a low level during reception of light by the light receiving device 12 so as to substantially suspend the operation of the light emitting device 13. This realizes the half-duplex communication method in which the transmission and reception operations are not carried out concurrently, in the optical communication system S.

In the circuit of FIG. 4, the operation of the light receiving device 12 (PD) is substantially suspended during the emission of light (luminescence) from the light emitting device 13 (LED) in the transmission mode and the operation of the LED is suspended in the reception mode, thereby realizing the half-duplex communication in which the transmission and reception operations are not carried out concurrently. A timing chart thereof is shown in FIG. 6.

Figure 6:
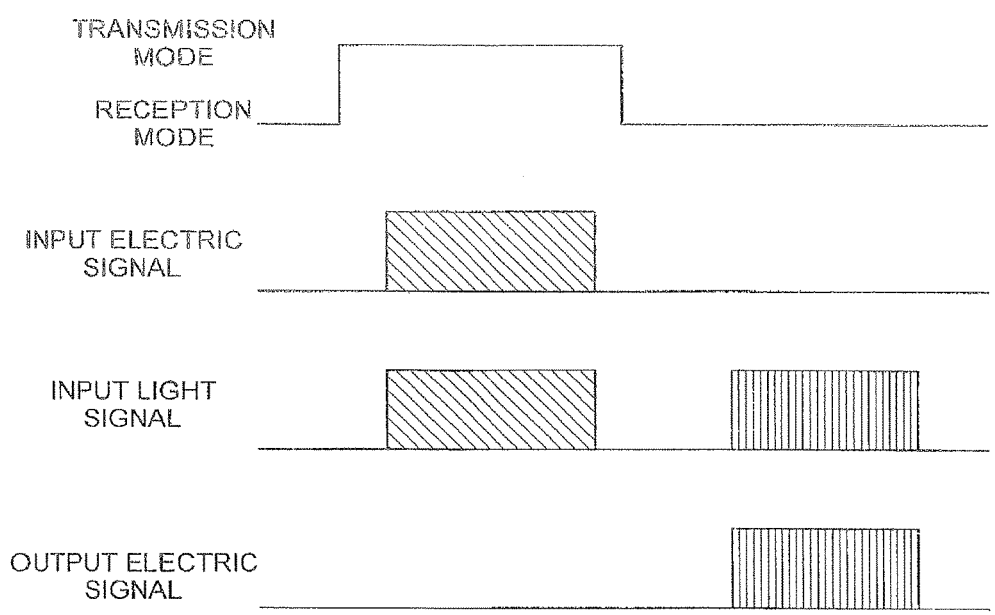
FIG. 6 is a timing chart in the half-duplex communication method of the single-core optical transceiver according to the present invention.

The circuit of FIG. 4 operates as shown in the timing chart of FIG. 6. When a drive electric signal is fed to the LED in the transmission mode, the LED outputs the optical signal for communication to the optical fiber. The luminescence (communication optical signal) from the LED is not emitted only toward the optical fiber 2 but is also emitted toward the sapphire substrate at the same time.

Particularly, when the LED is coaxially arranged on the light receiving surface of the PD as shown in FIG. 2, the PD is affected by the light emitted toward the substrate from the LED. As long as the substrate of the LED is made of a material that absorbs the light of the emission wavelengths of the LED or an electrode is formed over the entire area of the back surface of the substrate, the light emitted toward the substrate from the LED is absorbed by the substrate or is reflected by the electrode laid over the back surface of the substrate, causing no significant effects.

However, in the case of the configuration wherein the nitride semiconductor layer is laid on the sapphire substrate that transmits the emission wavelengths of the LED and no electrode is formed on the back side of the sapphire substrate as in the present invention, the light emitted from the LED, which has the same wavelengths as the light transmitted through the optical fiber, propagates through the sapphire substrate and also enters the light receiving surface of the PD located immediately below it, as the light transmitted from the fiber does. In the PD arranged immediately below the LED, an electric charge is generated inside the PD by incident light and is output in the form of a photocurrent from the cathode of the PD.

Figure 5:
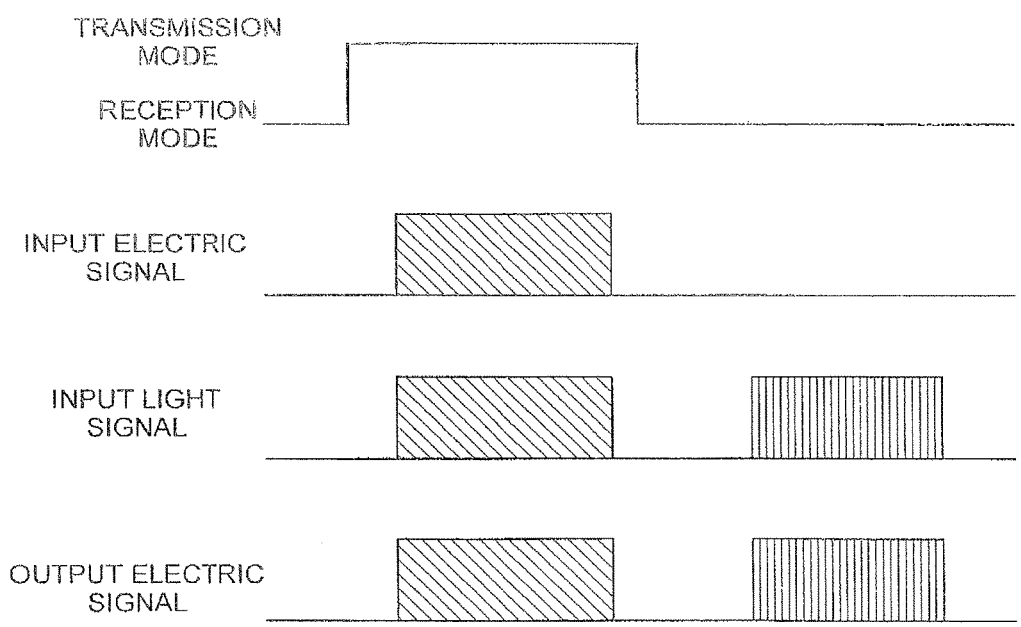
FIG. 5 is a timing chart in a configuration without a switch in the optical transceiver.

For this reason, if the circuit of FIG. 4 were configured without the switch 31, the PD would output a signal in the transmission mode (FIG. 5), contributing to a malfunction.

In the circuit of FIG. 4, the switch 31 is controlled by the changeover signal from the controller to keep the output of the light receiving device at the low level in the transmission mode so as to substantially suspend the operation of the light receiving device. For this reason, the PD is prevented from outputting a signal in the transmission mode, thus suppressing the malfunction.

Figure 7:
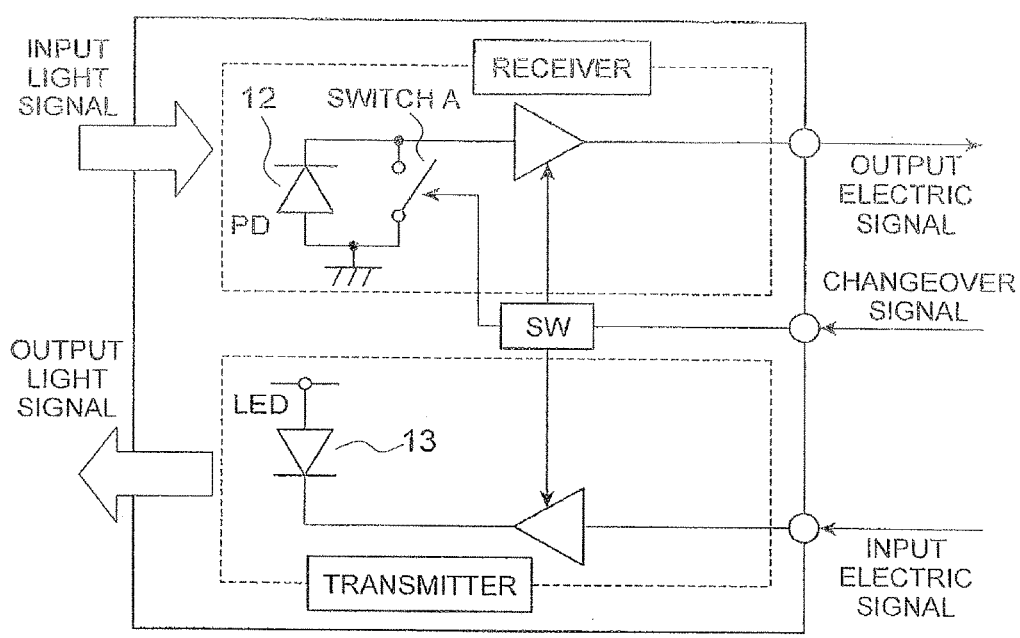
FIG. 7 is a block diagram showing one mode to realize the half-duplex communication function of the single-core optical transceiver according to the present invention.

In a further connection example of FIG. 7, the optical transceiver is configured so that the anode and cathode of the PD are connected through a discharge switch A. In the transmission mode, as described above, the light emitted from the LED is incident into the PD and thus an electric charge is generated inside the PD. In this circuit, the operation of the PD is suspended in the transmission mode to keep the PD from outputting a signal, and the switch A between the anode and cathode of the PD is turned on to establish a connection between the cathode and the anode to bring them to the ground potential, whereby the electric charge generated in the PD is discharged. If the mode were changed over to the reception mode while the electric charge generated inside the PD is accumulated inside the PD (in an as-charged state), the electric charge thus accumulated would leak as a photocurrent from the PD, contributing to a malfunction. The normal operation in the reception mode would not be allowed until the electric charge thus charged, which can contribute to a malfunction, is eliminated; therefore, a period of time between the transmission mode and the reception mode would become longer. Since the circuit of FIG. 7 is configured to discharge the electric charge generated in the PD due to the emission of the LED at the same time as it is generated, no electric charge is accumulated (or charged) inside the PD. Therefore, the optical transceiver can be switched into the normal operation immediately after the changeover to the reception mode. The switch A is turned off in periods of the reception mode, whereupon the signal light transmitted through the optical fiber is incident as an input light signal through the LED to the PD, to be output as an electric signal from the PD.

Figure 8:
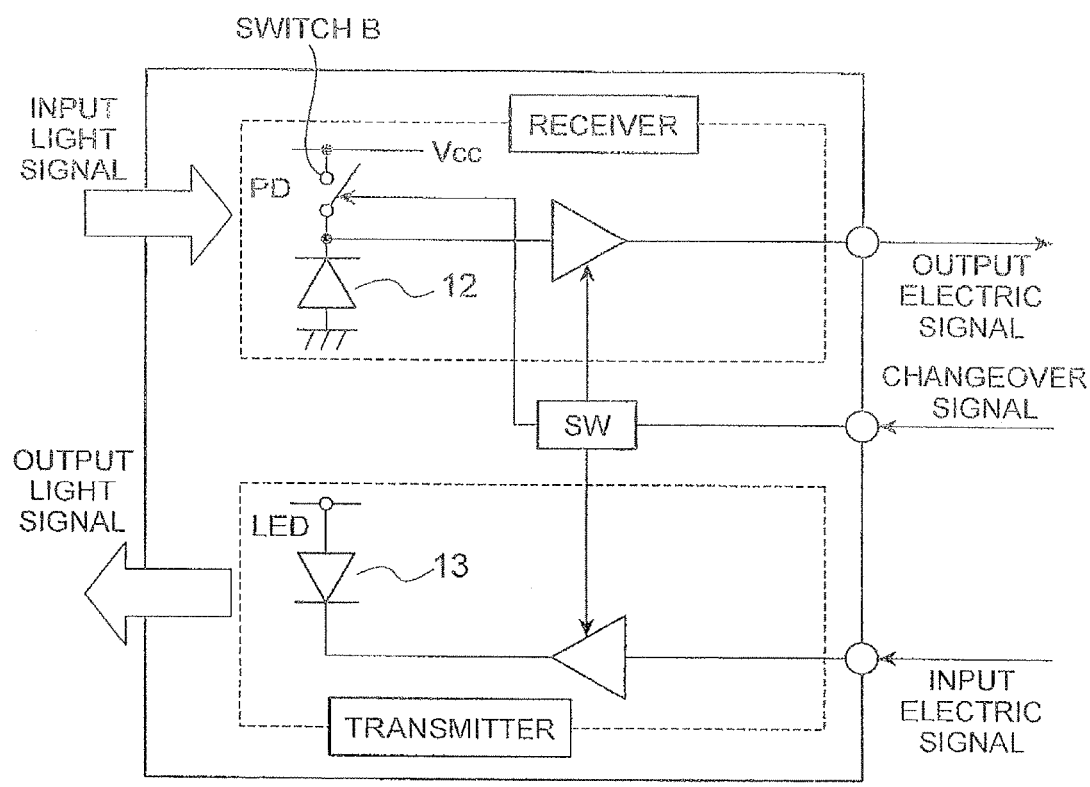
FIG. 8 is a block diagram showing another mode to realize the half-duplex communication function of the single-core optical transceiver according to the present invention.

Instead of the switch A of the PD in FIG. 7, a discharge switch B may be provided for connecting the cathode end of the PD to a reference potential of Vcc or the like as in a connection example of FIG. 8 and may be controlled in such a manner that the switch B is turned on in the transmission mode to connect the cathode of the PD to the reference potential of Vcc or the like to discharge the electric charge generated inside the PD. Since this configuration is also arranged to discharge the electric charge generated in the PD due to the emission of the LED at the same time as it is generated, as in the case of FIG. 7, no electric charge is accumulated (or charged) inside the PD. Therefore, the optical transceiver can be switched into the normal operation immediately after the changeover to the reception mode. The switch B is turned off in the periods of the reception mode, whereby the signal light transmitted through the optical fiber is incident as an input light signal through the LED into the PD, to be output as an electric signal from the PD.

As described above, the single-core optical transceiver 1 is so configured that the sapphire substrate 13b is arranged on the light receiving surface 12a of the light receiving device 12 so as to be coaxial with the light receiving surface 12a and the nitride semiconductor layer 13a is formed on the sapphire substrate 13b, to form the LED serving as the light emitting device 13. Since the light receiving device 12 and the light emitting device 13 are coaxially arranged in this manner, it becomes feasible to implement coupling thereof to the single optical fiber 2. When the sapphire substrate 13b is used as the substrate of the light emitting device 13, the optical signal in the wavelength band (e.g., from 450 nm to 600 nm) with low transmission loss in the optical fiber 2 can be guided through the sapphire substrate 13b up to the light receiving surface 12a of the light receiving device 12. Therefore, even in the configuration where the light emitting device 13 is arranged on the light receiving surface 12a of the light receiving device 12, the optical signal from the optical fiber 2 can be received on the entire area of the light receiving surface 12a, including the light in the central region where the light intensity is the highest in the light from the optical fiber 2, so as to adequately improve the light sensitivity.

In the single-core optical transceiver 1, the cathode electrode pad 21 and the anode electrode pad 22 in the light emitting device 13 are provided both on the light emitting surface 13c side of the light emitting device 13. This configuration eliminates a need for forming electrodes, wires, etc. on the back surface of the light emitting device 13, whereby a sufficient transmission region for optical signal can be secured in the sapphire substrate 13b. Therefore, the light sensitivity can be more adequately improved.

The single-core optical transceiver 1 further comprises the switch 31 for suspending the operation of the light receiving device 12 during the operation of the light emitting device 13 and for suspending the operation of the light emitting device 13 during the operation of the light receiving device 12. This configuration can suppress noise in the light receiving device 12 due to the emission of the light emitting device 13 and a failure due to diffuse reflection during the reception of light by the light receiving device 12.

An experiment to confirm the effects of the present invention will be described below.

This experiment was conducted as follows: samples were prepared including a single-core optical transceiver (Example) in a configuration wherein a green LED obtained by laying a nitride semiconductor layer on a sapphire substrate was arranged on a light receiving surface of a light receiving device comprised of an Si photodiode and an optical transceiver (Comparative Example) in a configuration wherein a red LED obtained by laying a nitride semiconductor layer on a GaAs substrate was arranged on a light receiving surface of a light receiving device comprised of an Si photodiode, and the light sensitivity and maximum communication distance were evaluated for each of the samples.

Example and Comparative Example both were prepared using the Si photodiode with the light receiving surface 0.8 mm $\phi$ in diameter (about 0.5 mm$^2$). The chip size of the green LED was 034 mm×0.35 mm (about 0.12 mm$^2$) in Example and the chip size of the red LED was 0.23 mm×0.23 mm (about 0.053 mm$^2$) in Comparative Example. Therefore, the exposed area of the light receiving surface of the Si photodiode is approximately 0.76 in Example and approximately 0.89 in Comparative Example, where the original area is defined as 1.

Under the foregoing conditions, the reception loss of the Si photodiode was measured for Example and Comparative Example; as shown in FIG. 9, the reception loss was approximately −1.5 dBm in Example and approximately −2.5 dBm in Comparative Example, obtaining the result that the reception loss in Example was about 1.0 dBm smaller than that in Comparative Example though the chip size of the LED was larger. It was confirmed by this result that in Example the optical signal from the optical fiber passed through the sapphire substrate to reach the light receiving surface of the light receiving device and the optical signal from the optical fiber 2 was received on the entire area of the light receiving surface 12a. The light sensitivity to green light (the wavelength of about 510 nm) in the Si photodiode is about 0.7 dBm lower than that to red light (the wavelength of about 650 nm) but the minimum light sensitivity of the optical transceiver is improved by the balance of about 0.3 dBm.

When the plastic optical fiber is used as the optical fiber, the transmission loss for red light is about 0.15 dB/m whereas the transmission loss for green light is about 0.09 dB/m. Therefore, when the same drive IC and signal processing IC are used, the maximum communication distance in the optical communication system is approximately 100 m in Comparative Example whereas that in Example can be improved to about 170 m.

INDUSTRIAL APPLICABILITY

The present invention is industrially applicable.

The invention claimed is:

1. A single-core optical transceiver, which is an optical transceiver for transmitting or receiving an optical signal through a single optical fiber, comprising a light emitting device for transmitting the optical signal and a light receiving device for receiving the optical signal,
    wherein the light emitting device is an LED configured including a sapphire substrate arranged on a light receiving surface of the light receiving device so as to be coaxial with the light receiving surface, and a nitride semiconductor layer laid on the sapphire substrate;
    further comprising a switch for suspending an operation of the light receiving device during an operation of the light emitting device and for suspending the operation of the light emitting device during the operation of the light receiving device.

2. The single-core optical transceiver according to claim 1, wherein the light emitting device is fixed to the light receiving surface of the light receiving device through a resin transparent to an emission wavelength of the light emitting device.

3. The single-core optical transceiver according to claim 2, wherein the resin is an epoxy resin or a silicone resin.

4. The single-core optical transceiver according to claim 1, wherein a cathode electrode pad and an anode electrode pad in the light emitting device are provided both on the light emitting surface side of the light emitting device.

5. The single-core optical transceiver according to claim 1, wherein a wavelength of the optical signal transmitted from the light emitting device is from 450 nm to 600 nm.

6. The single-core optical transceiver according to claim 5, wherein the wavelength of the optical signal transmitted from the light emitting device is 510 nm.

7. The single-core optical transceiver according to claim 1,
wherein an anode and a cathode of the light receiving device are connected through a discharge switch,
wherein the discharge switch is turned on during the operation of the light emitting device, and
wherein the discharge switch is turned off during the operation of the light receiving device.

8. The single-core optical transceiver according to claim 1,
wherein a cathode end of the light receiving device is connected through a discharge switch to a reference potential,
wherein the discharge switch is turned on during the operation of the light emitting device, and
wherein the discharge switch is turned off during the operation of the light receiving device.

9. The single-core optical transceiver according to claim 1, wherein the single optical fiber is a plastic optical fiber.

* * * * *